(12) United States Patent
Gallet et al.

(10) Patent No.: US 9,679,145 B2
(45) Date of Patent: Jun. 13, 2017

(54) INCREASED FLEXIBILITY OF SECURITY FRAMEWORK DURING LOW POWER MODES MANAGEMENT

(71) Applicant: Optis Circuit Technology, LLC, Plano, TX (US)

(72) Inventors: Gilles Gallet, Ampuis (FR); Julie Gonin, Sassenage (FR); Nicolas Mareau, Crolles (FR); Claire Verilhac, Pierre-Chatel (FR)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 116 days.

(21) Appl. No.: 14/351,167

(22) PCT Filed: Oct. 4, 2012

(86) PCT No.: PCT/EP2012/069674
§ 371 (c)(1),
(2) Date: Apr. 11, 2014

(87) PCT Pub. No.: WO2013/053640
PCT Pub. Date: Apr. 18, 2013

(65) Prior Publication Data
US 2014/0298480 A1    Oct. 2, 2014

Related U.S. Application Data

(60) Provisional application No. 61/550,077, filed on Oct. 21, 2011, provisional application No. 61/550,553, filed on Oct. 24, 2011.

(30) Foreign Application Priority Data

Oct. 11, 2011  (EP) .................................. 11306315

(51) Int. Cl.
G06F 21/60 (2013.01)
G06F 1/32 (2006.01)
G06F 21/81 (2013.01)

(52) U.S. Cl.
CPC ............ *G06F 21/60* (2013.01); *G06F 1/3203* (2013.01); *G06F 1/3234* (2013.01); *G06F 21/81* (2013.01)

(58) Field of Classification Search
CPC ........ G06F 21/60; G06F 21/81; G06F 1/3203; G06F 1/3234
See application file for complete search history.

(56) References Cited

U.S. PATENT DOCUMENTS

2006/0053326 A1* 3/2006 Naveh et al. ................. 713/323
2008/0178025 A1* 7/2008 Hand .................... G06F 3/0607
713/323

(Continued)

FOREIGN PATENT DOCUMENTS

EP    2 360 611 A1    8/2011

OTHER PUBLICATIONS

Extended European Search Report issued in corresponding European application No. 11306315.0, dated Mar. 21, 2012.

(Continued)

*Primary Examiner* — Eleni Shiferaw
*Assistant Examiner* — Alexander Lapian
(74) *Attorney, Agent, or Firm* — The Danamraj Law Group, P.C.; Thomas L. Crisman; Kenneth A. McClure (57) ABSTRACT

The present invention relates to a method of managing switching from a first mode of operation to a second mode of operation a first processor in a processing device which comprises at least one other processor and a controller processor. The method comprises receiving a message which comprises a request to switch the first processor from (Continued)

a first to a second mode of operation; deciding whether the switching is appropriate; and upon decision of switching, switching the first processor from a first mode of operation to a second mode of operation according to the selected type of switching.

19 Claims, 6 Drawing Sheets

(56) References Cited

U.S. PATENT DOCUMENTS

| | | | | |
|---|---|---|---|---|
| 2009/0164814 A1* | 6/2009 | Axford | ............... | G06F 1/3203 713/320 |
| 2009/0172423 A1* | 7/2009 | Song | ................ | G06F 1/3203 713/300 |
| 2009/0235105 A1* | 9/2009 | Branover | ............ | G06F 1/3203 713/330 |
| 2009/0292934 A1* | 11/2009 | Esliger | ........................ | 713/323 |
| 2012/0054479 A1* | 3/2012 | Park | ................................ | 713/2 |

OTHER PUBLICATIONS

Bergamaschi, Reinaldo et al., "Exploring Power Management in Multi-Core Systems," 2008 Design Automation Conference, ASPDAC 2008 (Asia and South Pacific), IEEE, Piscataway, NJ, USA, Mar. 21, 2008, pp. 708-713, XP031241442, ISBN: 978-1-4244-1921-0.

International Search Report issued in corresponding International application No. PCT/EP2012/069674, date of mailing Nov. 21, 2012.

* cited by examiner

INCREASED FLEXIBILITY OF SECURITY FRAMEWORK DURING LOW POWER MODES MANAGEMENT

TECHNICAL FIELD

The present invention generally relates to devices and methods for the improvement of flexibility of security framework during low power modes management. It concerns more particularly techniques for ensuring high security level and performances for a security environment when low power modes are entered.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

A System-on-Chip (SoC) platform typically comprises at least one embedded Central Processing Unit (CPU) or processor, at least one embedded functional unit (also called an IP in the jargon of the one with ordinary skills in the art) which may be a memory (for instance of the eSRAM type), a Memory Management Unit (MMU), and/or at least one register. The components of the SoC are typically interconnected through an internal bus matrix.

In operation, the SoC platform may be led to manipulate sensitive data, for instance, cryptographic secret keys or unencoded secret data like passwords. To prevent unauthorized access to and/or corruption of these sensitive data, the architecture of the SoC platform may be split into two physically and functionally separated environments: a secure environment for manipulating sensitive data and a public environment for processing non-sensitive data. The secure environment comprises notably one or more dedicated secure memories and/or one or more secure hardware registers to store sensitive data, whereas the public environment may include its own dedicated memories and/or hardware registers to store public data.

This separation is for example implemented by Advanced RISC Machine (ARM) SoC platforms with security extensions, for example the TrustZone™ technology. A clear frontier between these two environments may be implemented with hardware (HW) and/or software (SW) mechanisms embedded in the processor, in the bus matrix, and in the IPs themselves. This frontier ensures that secure data within the secure environment cannot be accessed by any public component belonging to the public environment. This may typically be the case for active modes of operation of the platform, wherein memories, IPs and processors are kept powered-on or in retention. However, some modes of operation are available wherein one or more of the secure components can be powered off, meaning that at least some of their contents have to be saved during the particular mode and be restored thereafter. Such modes may be available for the purpose of optimizing the power strategy of the chip and decrease energy leakages.

A dedicated persistent secure memory, included in the secure environment, may be used to store securely sensitive data present in the secure environment before switching from an active mode to an energy saving mode (low-power mode). Persistent memory may include ROM memories of any available types for instance.

The European patent application EP10191115 discloses a possible method to manage switching between the two modes of operation for a processing device comprising multiple cores and/or processors.

To enable a safe and efficient switching, communications can be established between cores and/or processors, typically in a "master-slave" communication architecture. The master-slave communications may imply that cores/processors have to be asleep or waken-up synchronously. In particular, it may be impossible to switch off/on only one of the cores/processors, while other ones are still active.

Moreover, one can design a processing architecture with, for instance, two multi-cores processors: one for high performances (such as video encoding), and another one for low consumption scenarios (such as global monitoring of inputs). In such architectures (also named "big-little" architecture), it may be advantageous to power-off the high-performance processor to save battery. Communications between processors can imply a lot of possible and complex use cases that are to be handled by the processors. Thus, developing codes for handling such use cases can be difficult and complex.

Embodiments of the present invention aim at simplifying the architecture and increasing the flexibility of frameworks during the management of low power modes.

SUMMARY OF THE INVENTION

The invention relates to a method of managing switching from a first mode of operation to a second mode of operation of a first processor in a processing device. The processing device further comprises at least one other processor and a controller processor. The other processor is able to be switched in the first mode of operation or in the second mode of operation.

The method comprises:
  the controller receiving a message, said message comprising a request to switch at least the first processor from a first mode of operation to a second mode of operation according to a type of switching in a set of types of switching;
  the controller deciding whether the switching according to said type of switching is appropriate, the decision being a function of at least a current mode of operation of at least the other processor and the requested type of switching;
  upon decision of switching,
    the controller sending a message to at least the first processor to prepare the switching of the first processor from a first mode of operation to a second mode of operation according to the type of switching; and
    the controller switching the first processor from a first mode of operation to a second mode of operation according to the type of switching.

Hence, the decision of switching and the verification whether the switching is appropriate are made centrally, in the controller of the processing device. This embodiment enables simplifying the architecture and increasing the flexibility of frameworks.

For simplification purpose, when referring to a processor, the description may also refer to a Central processing unit (CPU), a microprocessor, a CPU on one chip as part of a microcomputer, a graphics processing unit (GPU/VPU), a physics processing unit (PPU), a digital signal processor, a cluster of processor, a multi-processor, a threaded-processor, etc.

According to possible embodiment, the method may further comprise:

upon reception of the sent message by the controller, the first processor deciding whether the switching according to said type of switching is appropriate, the decision being a function of at least a the requested type of switching;

upon decision of switching made by the first processor, the first processor prepares the switching from the first mode of operation to the second mode of operation according to the type of switching.

Thus, security checks may also be performed on the processors side. A truth table may be used to analyze whether security hole exists for the processors itself. If not, the switching may be performed by the first processor with delay.

Additionally, the first processor may send a return value to the controller to inform it about any errors/failures. If there is an error, the controller may avoid powering off the first processor.

According to another embodiment, upon switching in the first mode of operation or in the second mode of operation of the other processor, the controller may consolidate the current mode of operation of the other processor.

Thus, the controller is able to consolidate, at every moment, the status of the other processors. If it is to be decided whether the switching of the first processor is appropriate in view of the status of the other processor, the controller may provide all the information needed.

The status of the other processor is then always up-to-date.

Thus, a consolidation of all status for all processors can be driven centrally by the controller and the controller may be able to determine the adequate switching commands/modes for each processor regarding the other statuses.

According to another embodiment, the decision whether the switching is appropriate made by the first processor and/or the controller may be made by comparing at least the message received with a table of predetermined cases.

Hence, the implementation is straight-forward: a truth table can be implemented in a straight-forward manner. Moreover, a truth table eases the verification of the completeness of the forecast cases: developers can check that no case has been omitted.

Finally, a truth table is straight-forward to implement on a chip and in particular on a processor side and/or on a controller side.

According to another embodiment, the first processor may be arranged to handle its own context data (named "personal context data" in the following description and claims), the processing device being coupled to a first storage unit adapted to ensure persistency of data therein. The preparation of switching according at least one type of switching in the set of types of switching may further comprise storing the personal context data in the first storage unit or restoring the personal context data from the first storage unit.

The storage/restore of the personal context data is very important in order to power off a processor without loosing any information related to the processor itself.

According to another embodiment, the first processor and the other processor may be arranged to handle a shared context data, and the processing device may be coupled to a second storage unit adapted to ensure persistency of data therein. The preparation of switching according at least one type of switching in the set of types of switching may further comprise storing the shared context data handled in the second storage unit or restoring the shared context data handled from the second storage unit.

The storage/restore of the shared context data is very important in order to power off all processors without loosing any information related to the processing device itself.

The second storage unit can be advantageously the first storage unit.

In yet another embodiment, the processing device is adapted to securely handle sensitive data stored for instance in an eSRAM memory, and the processing device is coupled to a third storage unit adapted to ensure persistency of data therein. The preparation of switching according at least one type of switching in the set of types of switching may further comprise storing the sensitive data in the third storage unit or restoring the sensitive data from the third storage unit.

The storage/restore of the eSRAM memory is very important in order to power off the entire processing unit without loosing any information stored in the eSRAM memory such as sensitive data.

The third storage unit can be advantageously the first storage unit or the second storage unit.

Yet another aspect of the invention relates to a processing device comprising:

a first processor, and at least another processor being able to be switched in a first mode of operation or in a second mode of operation, a controller to manage switching from the first mode of operation to the second mode.

The controller is configured to:

receive a message, said message comprising a request to switch at least the first processor from a first mode of operation to a second mode of operation according to a type of switching in a set of types of switching;

decide whether the switching according to said type of switching is appropriate, the decision being a function of at least a current mode of operation of at least the other processor and the requested type of switching;

upon decision of switching, send a message to at least the first processor to prepare the switching of the first processor from a first mode of operation to a second mode of operation according to the type of switching; and switch the first processor from a first mode of operation to a second mode of operation according to the type of switching.

The power controller may retrieve a return value from the first processor after the sending of the message step.

This return value may be part of a message sent by the first processor. This message may be part of the preparation of switching from a first mode of operation to a second mode of operation according to the type of switching.

The return value may be an error value which represents the status of the saving operation, and which can prevent the power controller to enter the low power state (cancellation of current power mode request and return back to public code for the processor).

The return value may be a non-error value. Thus new requests from controller to enter another power mode are possible. The controller may also switch off memory, voltages, etc.: thus, the first processor may only be able to perform save or restore operations prior to the power off.

A third aspect relates to an electronic device comprising a processing device as described above. Such device may be a mobile device such as a smart phone, a PDA, a pocket PC or the like.

A fourth aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

Figure 1A:
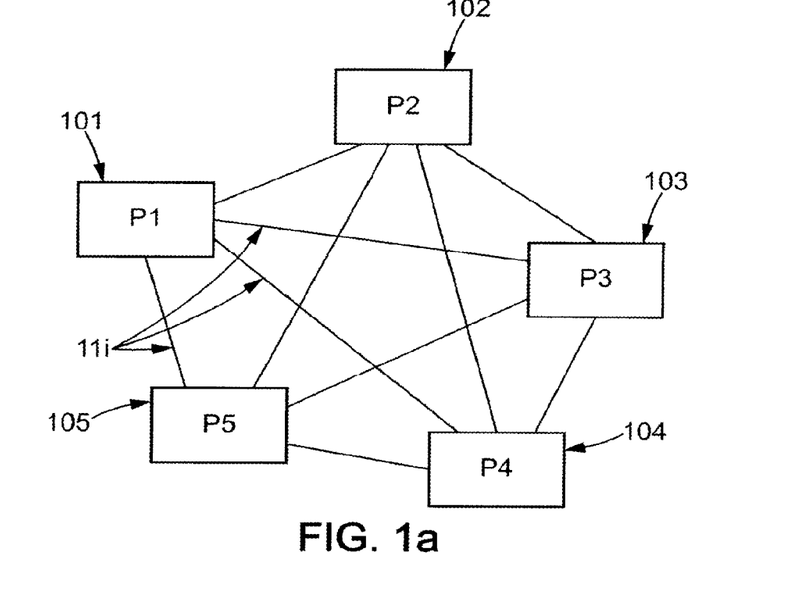
FIG. 1a and FIG. 1b are two possible synchronization architectures for a multi-processors processing device, which respectively illustrate peer-to-peer and star architectures.
Figure 1B:
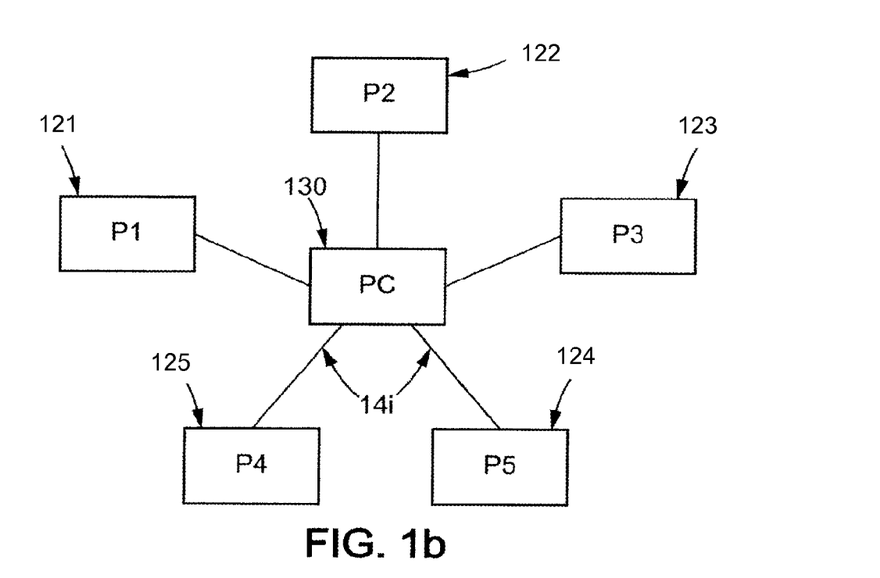

FIG. 1a and FIG. 1b are two possible synchronization architectures for a multi-processors processing device.

A naive way to synchronize power off/on between multiple processors is to add new use cases to existing frameworks. Thus, the synchronization may imply peer-to-peer communications 11i between processors (101 to 105) in order to be able to switch on/off processors safely and efficiently. The number of peer-to-peer communications would rise exponentially with the number of processors.

This synchronization architecture may also induce many new tests in the state machine of the processing device, highly complicating communications between cores themselves and/or with the power controller. This synchronization architecture is therefore complex to develop, test, manage and maintain. There is also a risk to omit use cases and thus, crashes may occur in specific cases.

In order to ease the synchronization and the related code conception, the architecture in a possible embodiment of the invention is based on a "star architecture": all processors (121 to 125) communicate only with the power controller (130). Therefore, this architecture avoids direct synchronizations between cores/processors. Then, ROM code in processors is rendered very simple and robust, while keeping all aspects linked to application level to the power controller.

Consequently, the power controller of the processing device is in charge of consolidating the status of all processors. This architecture is scalable as the number of communications (14i) is linear with the number of processors/cores.

Figure 2:
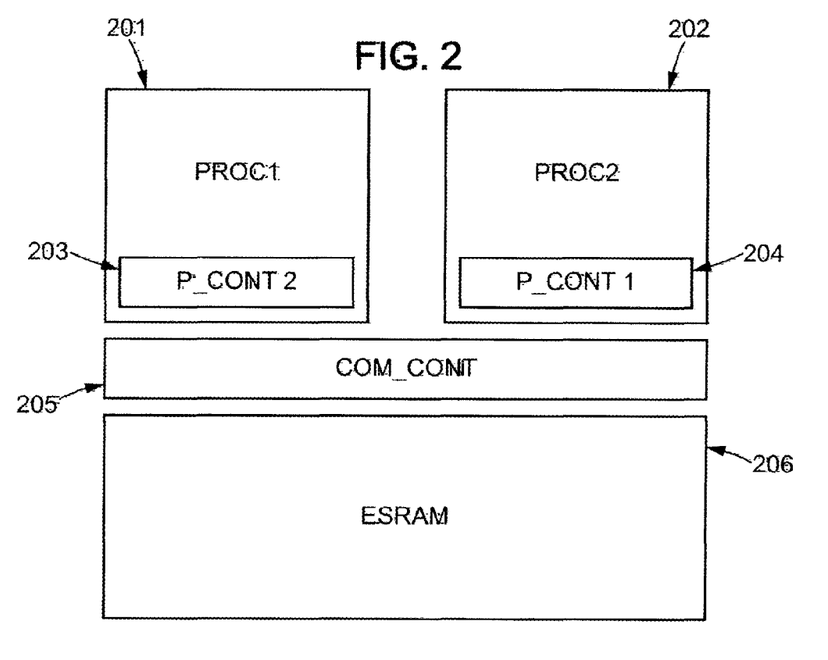
FIG. 2 presents the different contexts and memories of a typical processing device.

FIG. 2 shows an example of architecture of a typical processing device.

The processing device comprises in this example two processors (201 and 202). Moreover, each processor has a personal context (203 and 204) which is typically composed of internal registers, internal caches, etc. In addition, a shared context 205 may be shared between these two processors (typically hardware accelerators, security registers, etc.). Finally, a static memory eSRAM 206 (which is typically a Static random-access memory) can be used for the processing needs of the processing unit.

Figure 3:
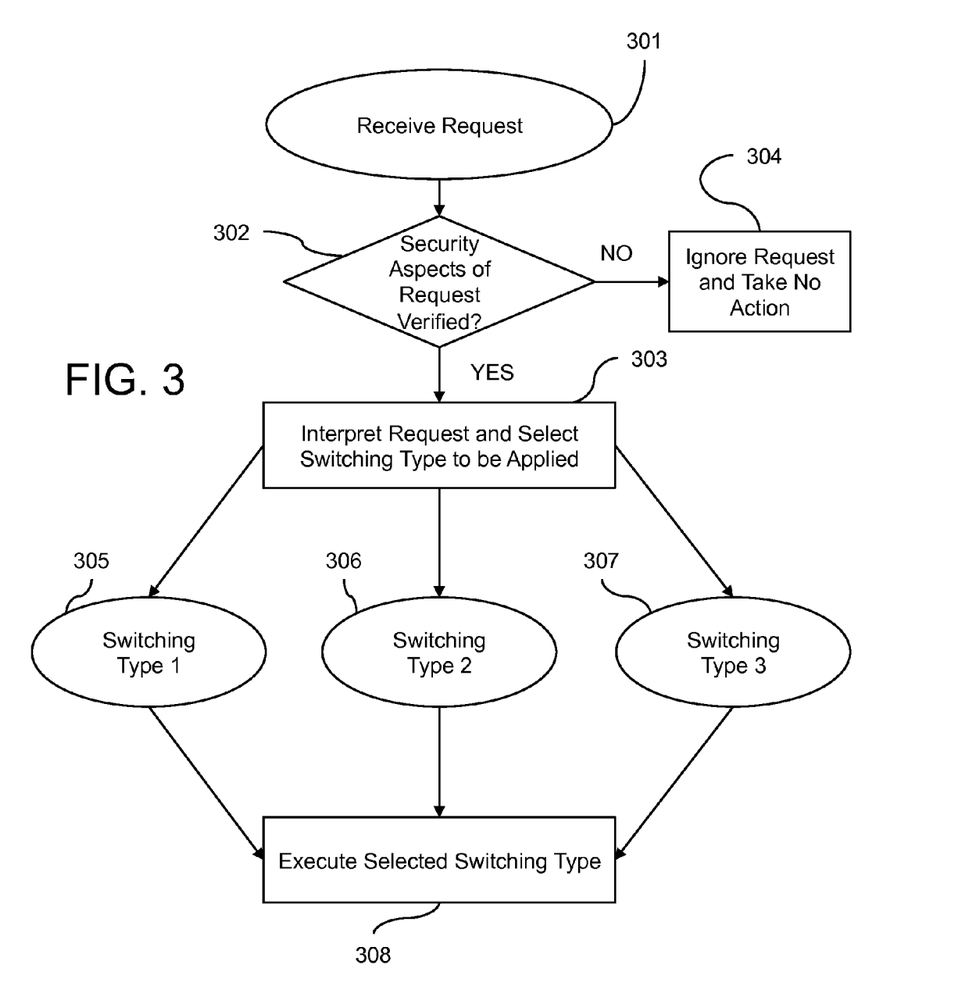
FIG. 3 is a possible flow chart for a request to switch one processor in a low power mode.

FIG. 3 is a possible flow chart for a request to switch in a low power mode for one processor in the processing device.

Upon reception of a message request (301) from the power controller, the processor may check security aspects of this request and thus validate it. Indeed, this verification could be important in order to ensure that the security and the robustness of the system are maintained.

This verification (302) is function of several parameters, such as:
  the "switching type" requested,
  the processor ID(s) designated by the request,
  the processors power status of the processing device, etc.
  "Switching type" examples are given in the following description.

The step of verification consists in ensuring that no incompatibility in requests is pending. For instance, the following statements are to be verified, in order to validate the request:
  if one or more processors is requested to be powered off without saving the shared context, at least one other processor is still powered on (in order to be able to preserve the shared context 205). Indeed, this is a security measure to avoid not having saved the security context, and so to avoid loosing security data (security failure);
  if one or more processors is requested to be powered off, they all have to be currently powered on (if not, it means that the consolidation of the status of the processors are not up to date and that a reset of this consolidation is needed);
  the "switching type" received is known;
  if one processor is requested to save the shared context 205, no other processor is currently saving the shared context (in order to avoid competing access in the memory and "dead-lock" issues for instance);
  if one processor is requested to save the static memory eSRAM 206, no other processor is currently saving the static memory (in order to avoid competing access in the memory and "dead-lock" issues for instance);
  etc.

If an incompatibility is discovered in a request or between requests then the current request message is ignored and no action is taken (304). If the verification does not discover any incompatibilities, the request is validated and, for instance save or restore operation may be performed.

In one other embodiment, if an incompatibility is discovered in a request or between requests, the status consolidation of the processors may be also reset. In yet another embodiment, all the processors may also be powered on to manage this security issue.

Thus the request is interpreted and the processors select (303) which switching type is to be applied (305, 306 and 307) according to the request transmitted. Finally the selected switching mode is executed (308).

Typical "switching types are" the following:
save the processor(s) personal context and power it off,
save the processor personal context, save the shared context, and power it off,
save the processor personal context, save the shared context, and save the static memory, and power it off,
power on a processor(s) and restore its(their) personal context,
power on a processor, restore its personal context, and restore the shared context,
power on a processor, restore its personal context, restore the shared context, and restore the static memory.

Request messages transmitted from the power controller to the processors can be, for instance, a "height bits" interrupt command. The command comprises in that case four bits to indicate the switching type (see above) and four bits to indicate the processor(s) which is (are) addressed by the message.

In one embodiment, the bits determining the switching types requested can be (in binary):
"0101" (i.e. 0x5 in hexadecimal), if the addressed processor have to save its personal context;
"0110" (i.e. 0x6 in hexadecimal), if the addressed processor have to save its personal context and the shared context;
"0111" (i.e. 0x7 in hexadecimal), if the addressed processor has to save its personal context, the shared context and the eSRAM.

In one embodiment, each bit of the four bits indicating the processor(s) which is (are) addressed by the message can refer to one single processor. For instance:
"0010" indicates that the second processor is addressed;
"0101" indicates that the third and first processors are addressed;
etc.

To illustrate this embodiment in a complete example, the following message requests (with code 0x59) that the first and fourth processors save their personal context.

| Switching type | | | | CPU4 | CPU3 | CPU2 | CPU1 |
|---|---|---|---|---|---|---|---|
| 0 | 1 | 0 | 1 | 1 | 0 | 0 | 1 |

The step of verification can consists in a verification of this message against a truth table. A truth table is a mathematical table used in logic to compute the functional values of logical expressions on each of their functional arguments.

Part of this flow chart can represent steps of an example of a computer program which may be executed by the power controller or the processors.

Figure 4:
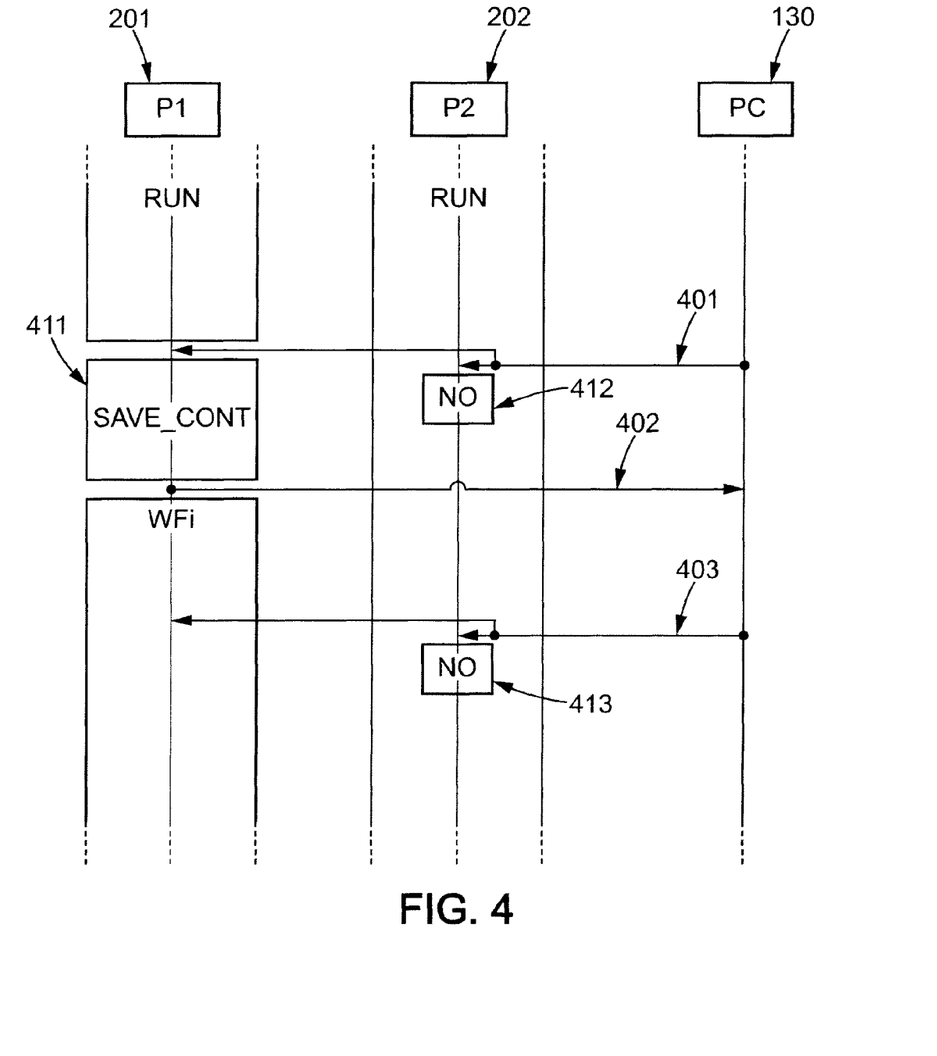
FIG. 4 is a possible sequence diagram between first processor, a second processor and a controller upon reception of a request to power off the first processor.

FIG. 4 is a possible sequence diagram between a first processor 201, a second processor 202 and a controller 130 upon reception of a request to power off only the first processor.

In a possible embodiment, the request is transmitted to the processors by means of interrupts. The interrupts are easy means to dispatch information to processors 201 and 202. Therefore interrupt 401 is received and processed by the two processors.

As the message only contains information regarding a "hotplug" sequence for the first processor 201 (as only the first processor is to be switched off) the second processor 202 determines that it is not concerned and thus ends (412) the interrupt processing.

A "hotplug" sequence aims at disabling at least one processor in order to improve the current consumption of the processing device.

The first processor 201, preparing to be powered off at the end of the hotplug sequence, saves (411) its personal context and thus informs (402) the power controller 130. At that moment, the first processor 201 is idle and waiting for the switching off performed by the controller (WFI mode) while the second processor still running normally.

The WFI mode stands for "Wait for Interrupt" mode. Wait for Interrupt mode disables most of the clocks of a CPU, while keeping its logic powered up. This reduces the power drawn to the static leakage current, plus a tiny clock power overhead required to enable the device to wake up from the WFI state. The transition from the WFI mode to the Run mode is caused by:
an interrupt, masked or unmasked
a debug request, regardless of whether debug is enabled
a reset.

Finally, the power controller 130 informs, by means of interrupt 403, processors whether any errors or changes occur during the synchronization and have been detected on the power controller side.

The power controller may finally perform hardware related actions to enter deeply in the power mode. These actions consist in powering off the processors. The power consumption of the processing device is then highly reduced as the electronic components (i.e. processors) are not powered on.

Figure 5:
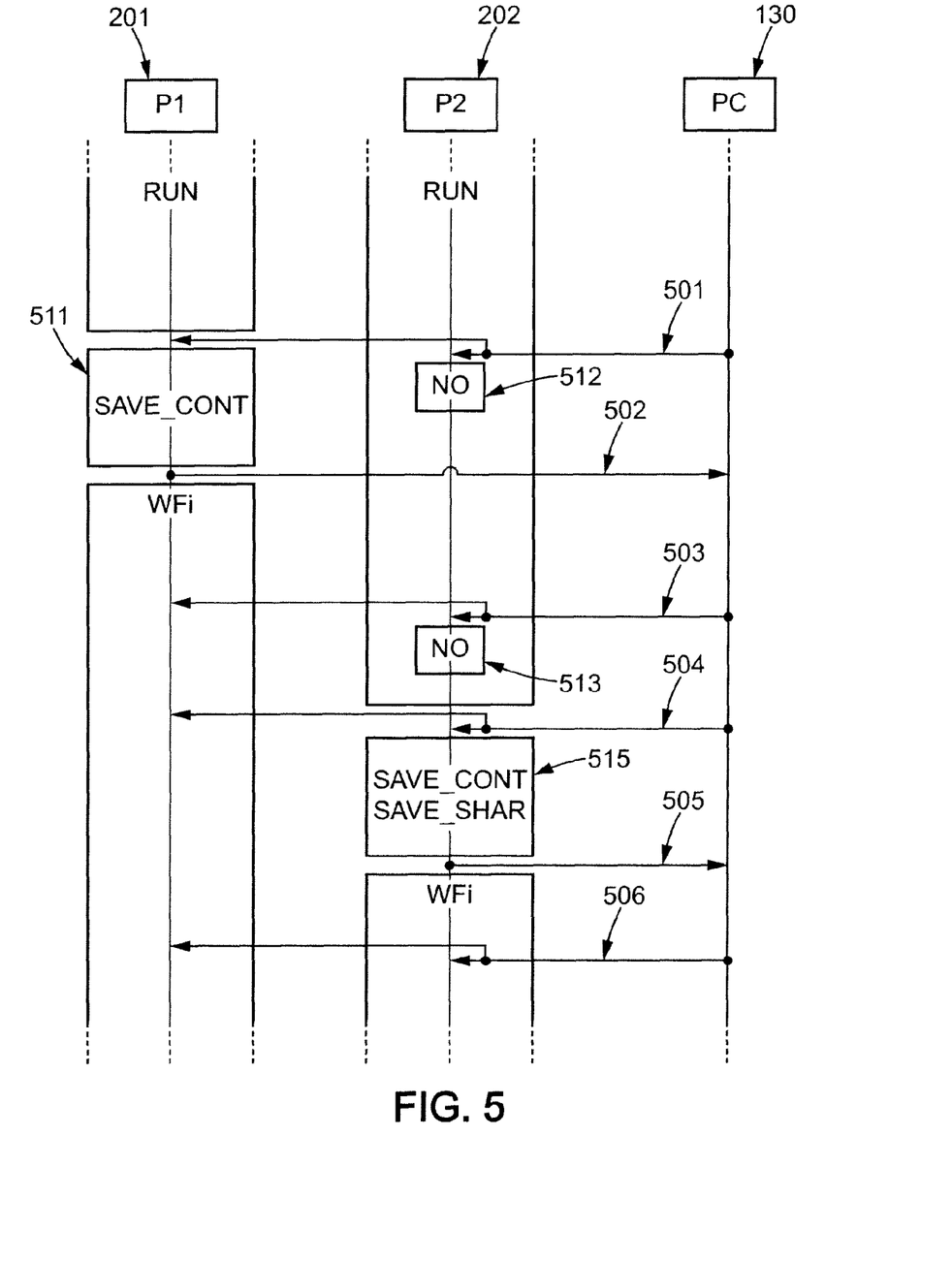
FIG. 5 is a possible sequence diagram between first processor, a second processor and a controller upon reception of a request to start a hotplug sequence and to power off both processors (deep sleep)

FIG. 5 is a possible sequence diagram between first processor 201, a second processor 202 and a controller 130 upon reception of a message to start a hotplug sequence for the first processor and the second processor to power off all the processors (deep sleep mode).

The request of the hotplug sequence is dispatched to all processors by means of interrupts 501. As the message only contains information regarding the power off of the first processor 201, the second processor 202 determines that it is not concerned and thus ends (512) the interrupt processing.

The first processor 201, preparing to be powered off at the end of that sequence, saves (511) its personal context and thus informs (502) the power controller 130. At that state, the first processor 201 is idle and waiting (WFI mode) while the second processor still running normally.

Then, the power controller 130 informs (by means of interrupt 503) processors whether any errors or changes occur during the synchronization and detected on the power controller side. The second processor 202 does not take any actions upon reception of the interrupt 503b.

Then, the power controller 130 informs the processors (through interrupt 504) that the second processor 202 is requested to save (515) its personal context and to save the shared context (as the second processor is the last processor still powered on and as it is requested to be powered off).

Optionally, the power controller can also request to save the memory eSRAM in this step.

After the saves, the second processor 202 communicates (505) to the power controller 130 the result of the saves operations. At this stage, the processors are still in WFI state, waiting for a future awaken message (or others) from power controller.

Finally, the power controller 130 acknowledges (506) previous synchronizations and communicates any error detected on the power controller side.

Figure 6:
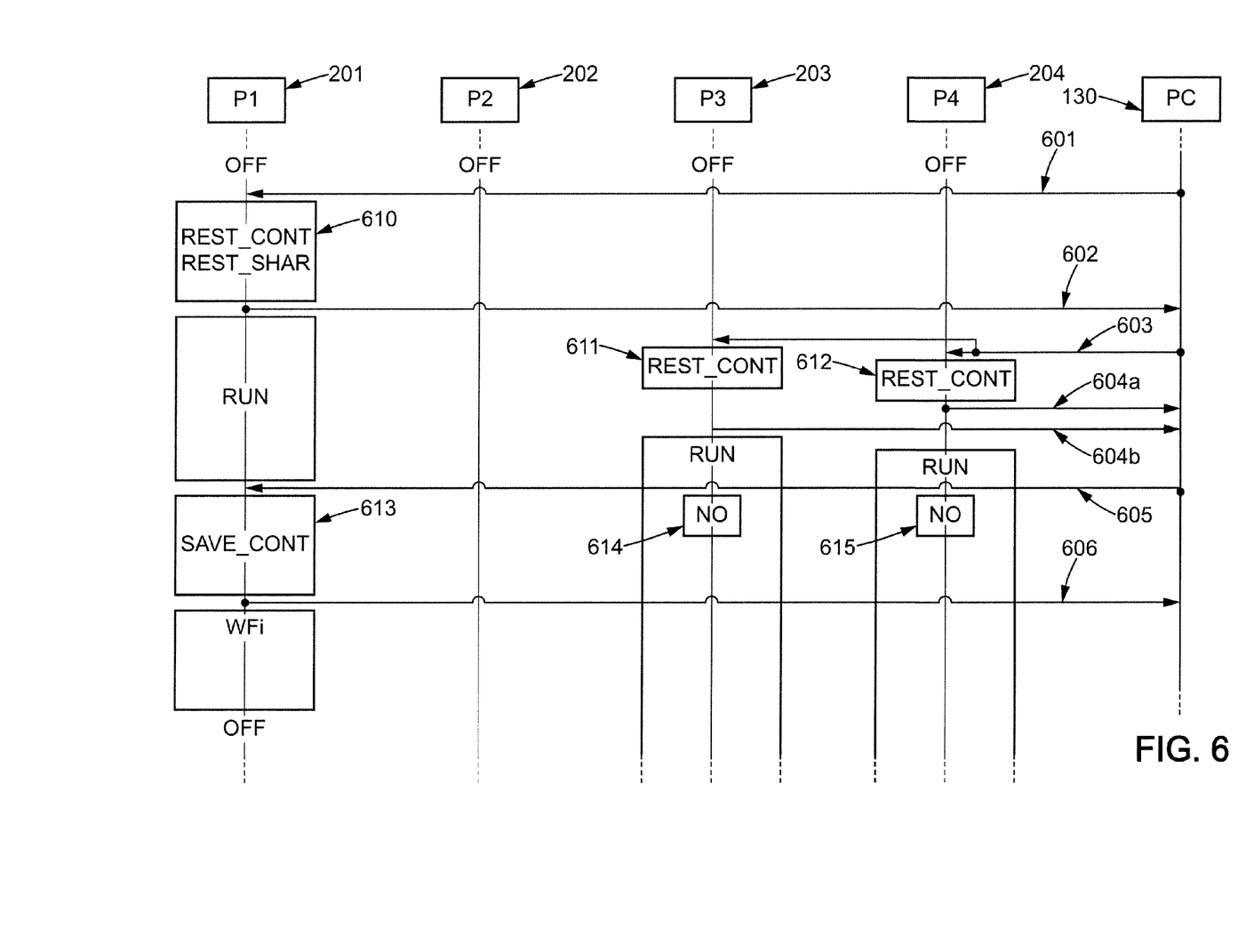
FIG. 6 is a possible sequence diagram between four processors and a controller upon reception of a request to start-up a processing unit gradually.

FIG. 6 is a possible data flow between four processors (201 to 204) and a controller (130) upon reception of a request to start-up a processing unit gradually.

To illustrate this use case, it is assumed in this example that the first and second processors (201 and 202) form a first cluster consuming energy sparsely. The third and fourth processors (203 and 204) form a second cluster which is very powerful but is energy-greedy.

At the beginning of the process, all processors are powered off. A reset signal is released (601) to wake-up the first processor 201 which, thus, restore its own context and restore the shared context from the memory (610). This interrupt aims at starting the platform with the least energy possible.

Then, the first processor communicates result of the context restore operations to power controller 130.

The power controller 130, in order to render the processing unit fully functional for highly current consuming use cases, transmit command (603) to the second cluster (i.e. processors 203 and 204) in order to wake them up. Both processors restore (611 and 612) their own personal context and inform the power controller that they are fully functional (604a and 604b).

Low power processor (201) can now be switched off since the second cluster is able to fulfil user requirements (i.e. a highly current consuming operation). Thus, the power controller informs (605) the first processor 201 to save (613) its context and to power off. Processors from the second cluster get this command but do not execute any action (614 and 615), as the command is addressed only to the first processor.

Before being powered off, the first processor 201 communicates to the power controller 130 the result of the personal context save operation.

After this last step, only the processors of the second cluster (ie. 203 and 204) are powered-on whereas the processors of the first cluster are powered-off (ie. 201 and 202).

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A method of managing the switching of a first processor from a first mode of operation to a second mode of operation in a processing device, the processing device comprising at least one other processor and a controller, each of the first processor and the other processor handling respective personal context data and the first processor and the other processor handling shared context data, the other processor being able to be switched in the first mode of operation or in the second mode of operation, the method comprising:

the controller receiving a message, said message comprising a request to switch at least the first processor from a first mode of operation to a second mode of operation according to a type of switching in a set of types of switching, the type of switching indicating desired context data to be saved prior to the switching or restored after the switching;

the controller deciding whether the switching according to said type of switching is appropriate, the decision being a function of at least a current mode of operation of at least the other processor and the requested type of switching;

upon decision of switching made by the controller, the controller sending a message to at least the first processor to prepare the switching of the first processor from a first mode of operation to a second mode of operation according to the type of switching;

the controller receiving a confirmation message from the first processor, wherein after sending the confirmation message the first processor enters a wait for interrupt mode;

the controller sending, while the first processor is in the wait for interrupt mode, another message to at least the first processor informing at least the first processor whether the controller detected any errors; and the controller switching the first processor from a first mode of operation to a second mode of operation according to the type of switching, wherein the first processor is powered off in the second mode of operation.

2. The method of claim 1, wherein the method further comprises:

upon reception of the sent message by the controller, the first processor deciding whether the switching according to said type of switching is appropriate, the decision being a function of at least the requested type of switching; and upon decision of switching made by the first processor, the first processor preparing the switching from the first mode of operation to the second mode of operation according to the type of switching.

3. The method of claim 1, wherein, upon switching of the other processor in the first mode of operation or in the second mode of operation the controller consolidates the current mode of operation of said other processor.

4. The method of claim 1, wherein the decision whether the switching is appropriate made by the first processor and/or the controller is made by comparing at least the message received with a table of predetermined cases.

5. The method of claim 1, wherein the processing device is coupled to a first storage unit adapted to ensure persistency of data stored therein, and wherein, the preparation of switching according to a first type of switching in the set of types of switching further comprises the first processor storing the personal context data for the first processor in the first storage unit.

6. The method of claim 5, wherein the processing device is coupled to a second storage unit adapted to ensure persistency of data stored therein, and wherein, the preparation of switching according to a second type of switching in the set of types of switching further comprises the first processor storing the personal context data for the first processor in the first storage unit and storing the shared context data handled in the second storage unit.

7. The method of claim 6, wherein the processing device is adapted to securely handle sensitive data, the processing device being coupled to a third storage unit adapted to ensure persistency of data stored therein, and wherein, the preparation of switching according to a third type of switching in the set of types of switching further comprises the first processor storing the personal context data for the first processor in the first storage unit, storing the shared context data handled in the second storage unit, and storing the sensitive data in the third storage unit.

8. A processing device comprising:
a first processor, at least another processor being able to be switched in a first mode of operation or in a second mode of operation, each of the first processor and the other processor handling respective personal context data and the first processor and the other processor handling shared context data, and a controller to manage switching from the first mode of operation to the second mode,
wherein the controller is configured to:
receive a message, said message comprising a request to switch at least the first processor from a first mode of operation to a second mode of operation according to a type of switching in a set of types of switching, the type of switching indicating desired context data to be saved prior to the switching or restored after the switching;
decide whether the switching according to said type of switching is appropriate, the decision being a function of at least a current mode of operation of at least the other processor and the requested type of switching; and
upon decision of switching, send a message to at least the first processor to prepare the switching of the first processor from a first mode of operation to a second mode of operation according to the type of switching, receive a confirmation message from the first processor, wherein after sending the confirmation message the first processor enters a wait for interrupt mode, send, while the first processor is in the wait for interrupt mode, another message to at least the first processor informing at least the first processor whether the controller detected any errors, and switch the first processor from a first mode of operation to a second mode of operation according to the type of switching, wherein first processor is powered off in the second mode of operation.

9. The processing device of claim 8, wherein, upon switching of the other processor in the first mode of operation or in the second mode of operation, the controller is further configured to consolidate the current mode of operation of said other processor.

10. The processing device of claim 8, wherein the controller is configured to decide whether the switching is appropriate by comparing the message received with a table of predetermined cases.

11. The processing device of claim 8, wherein the processing device is coupled to a first storage unit adapted to ensure persistency of data stored therein, and wherein the first processor stores the personal context data of the first processor in the first storage unit according to a first type of switching.

12. The processing device of claim 11, wherein the processing device is coupled to a second storage unit adapted to ensure persistency of data stored therein, and wherein the first processor stores the personal context data for the first processor in the first storage unit and stores the shared context data into the second storage unit according to a second type of switching.

13. The processing device of claim 12, wherein the processing device is adapted to securely handle sensitive data, the processing device being coupled to a third storage unit adapted to ensure persistency of data stored therein, and wherein the the first processor stores the personal context data for the first processor in the first storage unit, stores the shared context data into the second storage unit, and stores the sensitive data in the third storage unit.

14. An electronic device comprising:
a processing device, which comprises a first processor, and at least another processor, each of the first processor and the other processor handling respective personal context data and the first processor and the other processor handling shared context data, the another processor being able to be switched in a first mode of operation or in a second mode of operation, a controller to manage switching from the first mode of operation to the second mode, wherein the controller is configured to:
receive a message, said message comprising a request to switch at least the first processor from a first mode of operation to a second mode of operation according to a type of switching in a set of types of switching, the type of switching indicating desired context data to be saved prior to the switching or restored after the switching;
decide whether the switching according to said type of switching is appropriate, the decision being a function of at least a current mode of operation of at least the other processor and the requested type of switching; and
upon decision of switching, send a message to at least the first processor to prepare the switching of the first processor from a first mode of operation to a second mode of operation according to the type of switching, receive a confirmation message from the first processor, wherein after sending the confirmation message the first processor enters a wait for interrupt mode, send, while the first processor is in the wait for interrupt mode, another message to at least the first processor informing at least the first processor whether the controller detected any errors, and switch the first processor from a first mode of operation to a second mode of operation according to the type of switching, wherein first processor is powered off in the second mode of operation.

15. A computer program product comprising a non-transitory computer readable medium, having stored thereon a computer program comprising program instructions, the computer program being loadable into a data-processing device comprising a first processor, at least one other processor, each of the first processor and the other processor handling respective personal context data and the first processor and the other processor handling shared context data, and a controller, wherein the first and at least one other processor are switchable from a first mode of operation to a second mode of operation, wherein execution of the computer program by the data-processing device causes the controller to:
receive a message, said message comprising a request to switch at least the first processor from a first mode of operation to a second mode of operation according to a type of switching in a set of types of switching, the type of switching indicating desired context data to be saved prior to the switching or restored after the switching;
decide whether the switching according to said type of switching is appropriate, the decision being a function of at least a current mode of operation of at least the other processor and the requested type of switching;
upon decision of switching made by the controller, send a message to at least the first processor to prepare the switching of the first processor from a first mode of operation to a second mode of operation according to the type of switching;

receive a confirmation message from the first processor, wherein after sending the confirmation message the first processor enters a wait for interrupt mode;

send, while the first processor is in the wait for interrupt mode, another message to at least the first processor informing at least the first processor whether the controller detected any errors; and switch the first processor from a first mode of operation to a second mode of operation according to the type of switching, wherein first processor is powered off in the second mode of operation.

16. The electronic device of claim 14, wherein the processing device is coupled to a first and a second storage unit that are adapted to ensure persistency of data stored therein, and wherein the first processor is configured, during the preparation of switching according to a first type of switching in the set of types of switching, to store the personal context data for the first processor in the first storage unit and during the preparation of switching according to a second type of switching in the set of types of switching, to store the personal context data for the first processor in the first storage unit and store the shared context data handled in the second storage unit.

17. The electronic device of claim 16, wherein the processing device is adapted to securely handle sensitive data, the processing device being coupled to a third storage unit adapted to ensure persistency of data stored therein, and wherein the first processor is further configured, during the preparation of switching according to a third type of switching in the set of types of switching, to store the personal context data for the first processor in the first storage unit, store the shared context data handled in the second storage unit, and store the sensitive data in the third storage unit.

18. The computer program product of claim 15, wherein the data-processing device is coupled to a first and a second storage unit that are adapted to ensure persistency of data stored therein, and wherein execution of the computer program by the data-processing device causes the first processor, during the preparation of switching according to a first type of switching in the set of types of switching, to store the personal context data for the first processor in the first storage unit and during the preparation of switching according to a second type of switching in the set of types of switching, to store the personal context data for the first processor in the first storage unit and store the shared context data handled in the second storage unit.

19. The computer program product of claim 18, wherein the processing device is adapted to securely handle sensitive data, the processing device being coupled to a third storage unit adapted to ensure persistency of data stored therein, and wherein execution of the computer program by the data-processing device further causes the first processor, during the preparation of switching according to a third type of switching in the set of types of switching to store the personal context data for the first processor in the first storage unit, store the shared context data handled in the second storage unit, and store the sensitive data in the third storage unit.

* * * * *